June 14, 1927.
H. K. SCHRAGE
1,632,628
DYNAMO ELECTRIC MACHINE
Filed June 11, 1925   2 Sheets-Sheet 1
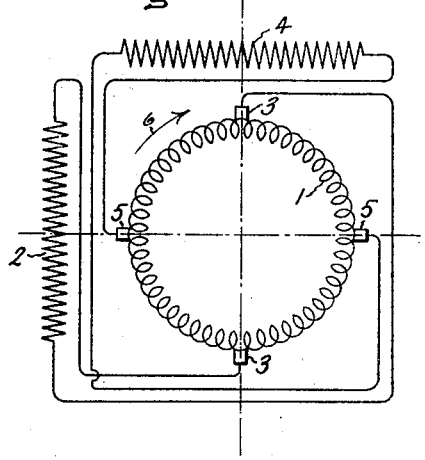
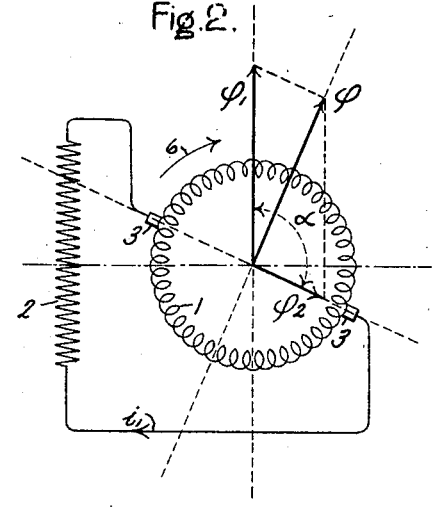
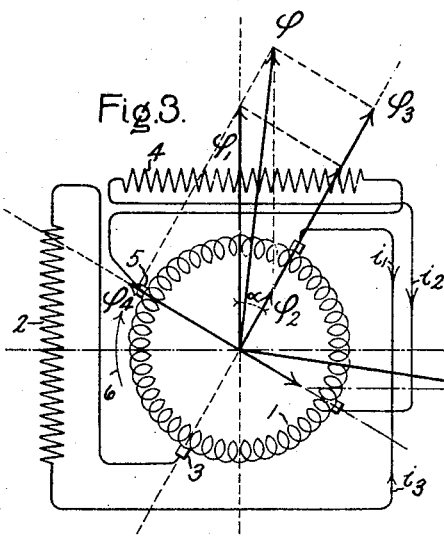
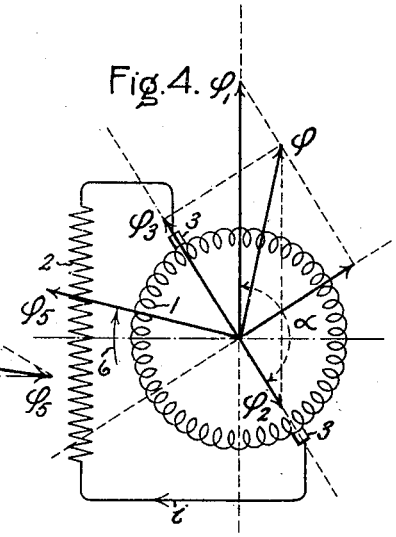
Inventor:
Hidde K. Schrage.
by Alexander S. Lunt
His Attorney.

June 14, 1927.
H. K. SCHRAGE
1,632,628
DYNAMO ELECTRIC MACHINE
Filed June 11, 1925    2 Sheets-Sheet 2
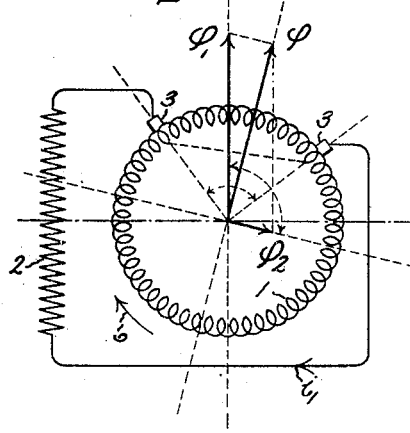
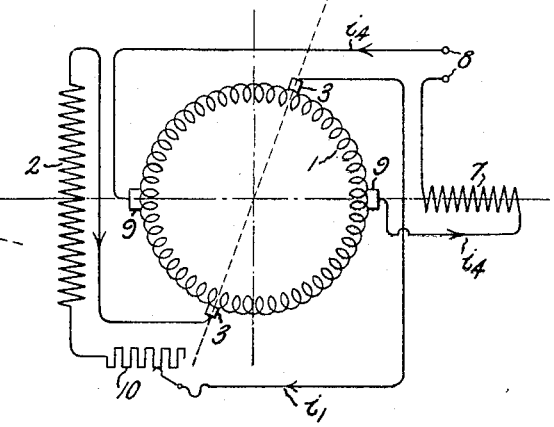
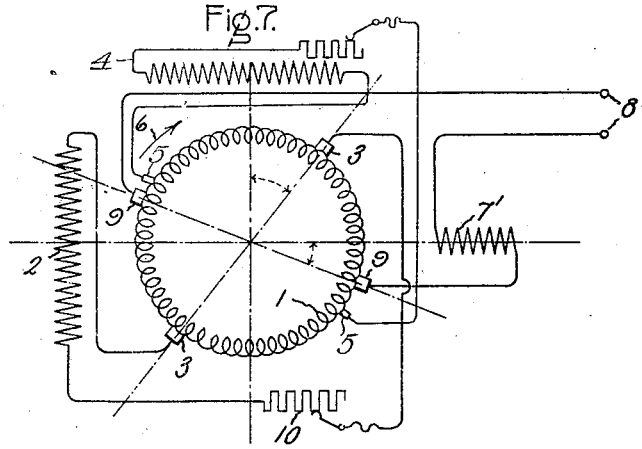
Inventor:
Hidde K. Schrage,
by
His Attorney.

Patented June 14, 1927.

1,632,628

UNITED STATES PATENT OFFICE.

HIDDE K. SCHRAGE, OF PARIS, FRANCE, ASSIGNOR TO GENERAL ELECTRIC COMPANY, A CORPORATION OF NEW YORK.

DYNAMO-ELECTRIC MACHINE.

Application filed June 11, 1925. Serial No. 36,523, and in France July 1, 1924.

My invention relates to a shunt-excited commutator generator or motor capable of being operated in connection with either direct or alternating current systems and arranged to have its characteristics controlled in a simple manner. In particular my invention relates to a compound wound dynamo electric machine of the above mentioned type having load and shunt excitation brushes which are independently adjustable with respect to the commutator whereby the no-load characteristics of the machine may be adjusted by means of the brushes associated with the shunt field and the load characteristics may be adjusted by varying the position of the load brushes.

It is known that under special conditions an alternating current machine will come up to saturation from its remnant magnetism and will operate in a stable manner at a definite frequency and voltage. I propose to provide such a commutator machine capable of having its characteristics determined by the position of its brushes. By this manner of adjustment the use of auxiliary devices is not essential and the control of the machine is greatly simplified.

My invention will be better understood on reference to the following description when considered in connection with the accompanying drawing and its scope will be pointed out in the appended claims.

Referring now to the drawing, Fig. 1 shows a machine in which my invention has been embodied; Figs. 2, 3 and 4 show how the magnetic field of the machine is modified by shifting the brushes; Fig. 5 shows how the brushes of the machine may be shifted to vary the terminal voltage without altering the phase of the magnetic field; Fig. 6 shows the machine provided with a compensating winding; and Fig. 7 shows a compound machine with independently adjustable load and excitation brushes.

Fig. 1 shows a machine provided with a rotatable commutator winding 1. The winding 1 is interconnected with the field winding 2 through one pair of diametrically opposed brushes 3 and with field winding 4 through another pair of diametrically opposed brushes 5, the field windings 2 and 4 being located on the machine stator member in quadrature with each other and the brushes 3 and 5 being shown as located at equi-distant points around the periphery of the commutator. As illustrated the machine is adapted for use in connection with a two-phase system. The precise arrangement of the field windings and brushes in each case will of course be determined by the number of phases. As hereinafter explained the machine may be operated either as a generator or motor in connection with a direct current, single phase or polyphase system.

Fig. 2 shows the flux conditions which obtain in one phase of the machine when the pairs of brushes 3 and 5 are shifted from the position shown in Fig. 1 through the angle $\alpha$ in the direction of the machine's rotation as indicated by the arrow 6. The pair of brushes 5 and the field winding 4 have been omitted in order to simplify the figure. Assuming the machine to be rotating at a certain speed and a current $i_1$ to traverse the circuit comprising the field winding 2 and the armature winding 1, the flux produced by the field winding 2 may be represented by $\varphi_1$, the flux produced by the winding 1 by $\varphi_2$ and the resultant or machine flux due to the windings 1 and 2 by $\varphi$. By change in the position of the brushes 3 the phase relation between the stator flux $\varphi_1$ and the rotor flux $\varphi_2$ may be altered and with each change in this relation the position of the resultant flux $\varphi$ in space is varied. With the brush position shown by Fig. 2 the resultant flux $\varphi$ is perpendicular to the axis of the brushes 3 and directly in line with the brushes 5. Under these conditions rotation of the winding 1 in the flux $\varphi$ sets up between the brushes 3 a voltage which tends to maintain the current $i_1$ and to render the machine self exciting. The circuit comprising the field winding 4 will be unaffected by rotation of the winding 1 in the flux $\varphi$ since the axis of this flux is parallel to the axis of brushes 5 which interconnect the windings 4 and 1. The indicated position of the flux $\varphi$ is therefore stable and the machine will operate as a direct current generator or motor. From the position shown by Fig. 2 the brush pairs 3 and 5 may be simultaneously shifted in either a clockwise or counter-clockwise direction.

Fig. 3 indicates the flux relations which obtain when the brushes are shifted in a clockwise direction, the rotation of the machine being clockwise as indicated by the arrow 6. For this brush position, as in that of Fig. 2, the flux produced by the current $i_1$ in the winding 2 is represented by the vector $\varphi_1$ and that produced by this current in the rotor winding 1 is represented by the vector $\varphi_2$. In this case it will be observed that the resultant flux $\varphi$ is not perpendicular to the axis of the brushes 3 but has a component $\varphi_3$ in line with these brushes and a component $\varphi_4$ perpendicular to the axis of these brushes and in line with the axis of brushes 5. The flux component $\varphi_4$, like the flux $\varphi$ of Fig. 2, produces a voltage between the brushes 3 which tends to maintain the current $i_1$. At the same time the flux component $\varphi_3$ produces between the brushes 5 a voltage giving rise to a current $i_2$ in the circuit comprising the windings 4 and 1 and this current produces a flux displaced from the flux $\varphi_1$ by 90 degrees in the direction of machine rotation. This flux produces a voltage between the brushes 3 which tends to diminish the current $i_1$. The resultant flux therefore is not stable in the position shown in Fig. 3 but will move in the direction of the machine's rotation. Now the flux produced by current $i_2$ has a component along the axis of the brushes 3 which tends to maintain the current $i_2$. The resultant flux will therefore be rotated in a clockwise direction until the component flux $\varphi_4$ decreases to zero and the current $i_1$ disappears. At this time the flux of the machine may be represented by the vector $\varphi_5$ displaced 90 degrees from the vector $\varphi$ in the direction of the machine's rotation. The flux $\varphi_5$ has a component along the axis of the brushes 5 which will produce a current $i_3$ in the windings 1 and 2 thereby tending to reduce the current $i_2$ in the same manner as the current $i_1$ was reduced by the current $i_2$. The machine flux will therefore move into a position where it is opposed to its original position as indicated by the vector $\varphi$. In a manner which will be clear from what has been said previously the machine flux will further rotate into a position opposed to the vector $\varphi_5$ and later into the position indicated by the vector $\varphi$ and will continue to rotate thereafter until the operating conditions of the machine are changed.

For a given speed of the rotor the speed at which the flux rotates will depend on the magnitude of the angle $\alpha$ through which the brushes are moved and upon the impedance of the exciting circuits. If the impedance of the excitation circuits is constant, the rotational speed of the flux and therefore the frequency of the machine current will decrease as the angle $\alpha$ is made larger. When the angle $\alpha$ is increased to a value at which the flux $\varphi$ is in the axis of the brushes 5 the machine flux is stationary and the machine will be a direct current machine as pointed out in connection with Fig. 2.

Fig. 4 shows the flux relations which obtain when the brushes 3 and 5 are moved in a clockwise direction from the position shown by Fig. 2. As before, the flux produced by the current $i_1$ in the winding 2 is represented by the vector $\varphi_1$, the rotor flux by the vector $\varphi_2$ and the machine flux by the vector $\varphi$. As in the case of Fig. 3 the flux $\varphi$ has a component $\varphi_3$ in the axis of brushes 3 which produces a voltage causing a current $i_2$ to flow in the circuit comprising windings 1 and 4, the winding 4 being omitted to avoid complexity in the figure. By the current $i_2$ there is produced a flux $\varphi_5$ displaced 90 degrees from $\varphi$ in a counter-clockwise direction. This flux $\varphi_5$ has a component in the axis of the brushes 5 which tends to decrease the current $i_1$ and a component in the axis of the brushes 3 which tends to maintain the current $i_2$. The machine flux is therefore not stable but will rotate in a counter-clockwise direction and at a rate of speed dependent on the magnitude of the angle through which the brushes have been shifted from the position indicated in Fig. 2. The frequency of the machine current is therefore determined by the amount of brush shift from the position of Fig. 2 and its phase sequence is determined by the direction in which the brushes are shifted.

Fig. 5 illustrates how the machine voltage may be regulated independently of the frequency. If the brushes 3 are shifted in opposite directions through equal angles, the flux $\varphi$ is still perpendicular to the axis of the brushes 3 and the machine will operate as a direct current machine with the voltage reduced somewhat below that which would obtain with the brush arrangement indicated by Fig. 2. It thus appears that the voltage of the machine depends to a large extent on the separation of the brushes in the same phase while the frequency of its current depends to a large extent on the position of the axis of the brushes. It is thus possible to regulate more or less independently the voltage and frequency of the machine simply by displacement of the brushes and without the use of auxiliary devices. To this end the corresponding brushes of each brush pair may be mounted on one brush ring and the other brushes of each brush pair may be mounted on a different brush ring, the two brush rings being moved simultaneously in the same direction to vary the frequency and simultaneously in opposite directions to vary the voltage.

Up to this point the machine has been considered as operating at no load, $i_1$ $i_2$ being its exciting currents. It will be apparent however that it may be operated either as a motor or a self excited generator. When operated as a generator the load current may be taken from the brushes 3 and 5, from the brushes 3 or 5 alone, or from one brush 3 and one brush 5. As hereinafter pointed out certain important results may be obtained if separate brushes are provided to carry the load current, the brushes 3 and 5 being utilized solely to carry the exciting current of the machine. The load brushes may be fixed or movable and need not carry currents of the same number of phase as the exciting brushes. The load may be connected in series with the field windings of the machine as is done in a series direct current machine. In this case the machine is self exciting and operates with series characteristics and regulable frequency. By the provision of both series and shunt field windings the machine may be made to have the characteristics of a compound machine. The machine may thus be arranged to have the characteristics of a shunt, series or compound machine and can be made to supply direct current, single phase current or polyphase current at a voltage and frequency regulated simply by the displacement of its brushes.

It will be observed that, in the absence of a compensating winding or other suitable means for neutralizing the effect of the load current on the flux $\varphi$, the magnitude and position of this flux will be affected by the load current. Fig. 6 shows how the voltage and frequency of the machine may be rendered independent of its load. In this figure, 7 indicates one phase of a compensating winding which is connected in series with the rotor winding 1 and the load terminals 8 through load brushes 9. The other windings are the same as those described in connection with the preceding figures. With this arrangement the exciting current is carried by the brushes 3 and 5 and the load current by the pair of brushes 9 and corresponding pairs of brushes in the other phases if the machine supplies polyphase current. The load current is indicated by the arrow head $i_4$. The winding 7 may be so designed that the current $i_4$ does not affect the field of the machine or may be made to modify the effect of the load current on the voltage and frequency of the machine. The frequency of the machine current may therefore be stabilized at a value dependent upon the position of the brushes.

Voltage stability is dependent upon the degree of magnetic saturation. It is well known that the voltage of a direct current machine with shunt excitation is stable only when operated at quite a strong saturation or in other words at a fairly high voltage. For the same reason the machine under consideration does not operate well at low voltages. With brush control of the voltage applied to the external circuit, however, it is a comparatively simple matter to maintain the saturation of the machine at a high value since by the use of separate load and exciting brushes the load terminal voltage of the machine may be readily changed without modifying the voltage of the exciting circuits. The saturation and voltage stability of the machine are therefore quite independent of its terminal voltage.

In Fig. 7 a compound machine is represented having an impedance 10 in the shunt excitation circuit and having its load brushes adjustable. Referring to Fig. 7 it will be apparent that at no load this machine with the series field acts, so far as the shunt excitation is concerned, as the machine of Fig. 1. Thus we can regulate the relation between the speed and the self-excitation frequency by displacing the brushes 3, 3. By providing an adjustable impedance 10 in the shunt excitation circuits we can further modify the saturation of the machine and the relation of excitation frequency to speed. Thus, for a certain speed the shunt excitation of the machine may be determined by the impedance 10 and the position of the brushes 3, 3 in such a way as to give exactly the frequency and voltage of the line 8 at the load terminals of the machine. At this speed the machine may operate as a motor at no load deriving its no load losses from the line or the machine may run as a no load motor supplying wattless current to the line for power factor correction. Since the same result may be obtained for different speeds it is evident that the speed and current of the machine may be varied at no load by adjustment of the shunt excitation circuits in the manner hereinbefore explained. When load is put on the motor it will be evident that the magnetic flux varies on account of the ampere turns due to load current unless the machine is exactly compensated as described in connection with Fig. 6. In Fig. 7 where the load brushes are displaced in the direction of rotation from the axis of the series winding 7' and load is applied to the motor, the speed naturally decreases with load. The difference between the no load speed and full load speed varies in proportion to such displacement of the load brushes without appreciably changing the no load speed. Thus this machine may operate from the line as a motor. The no load speed and power factor may be set by adjusting the brushes 3, 3 and the impedance 10 and the influence of the load current as regards speed and power factor under load may be regulated by displacement of the load brushes 9, 9. It is also evident that the load brushes 9, 9 may be more or less separated in the same manner as the shunt excitation brushes as explained in connection with Fig. 5.

In the case of Fig. 6 where the load brushes are assumed to be fixed, it is apparent that any of the useful means may be employed to improve commutation. In this case the load brushes may be made somewhat wider and of a lower resistance than the shunt excitation brushes as represented in Fig. 6.

I have explained my invention by illustrating and describing certain specific embodiments thereof, but it will be readily understood by those skilled in the art that the invention may be embodied in many other forms than those shown and described. I, accordingly, do not wish to be restricted to the particular forms of construction disclosed herein by way of example for the purpose of setting forth my invention in accordance with the patent statutes. The terms of the appended claims are, therefore, not restricted to the precise structure disclosed, but are intended to cover all changes and modifications within the spirit and scope of my invention.

What I claim as new and desire to secure by Letters Patent of the United States, is,—

1. A dynamo electric machine comprising a poly-phase shunt field winding, a compounding winding, an armature winding movably related to said field windings, a commutator for said armature winding, shunt excitation brushes associated with said commutator for transmitting current from said armature winding to said poly-phase shunt field winding, load brushes independent of said shunt excitation brushes associated with said commutator, and circuits for connecting said load brushes in series with said compounding field, said shunt excitation and load brushes being independently adjustable.

2. A dynamo electric machine comprising a poly-phase shunt field winding having independent phases, a compounding winding, an armature winding rotatably related to said field windings, a pair of shunt excitation brushes associated with said commutator for each phase of said shunt field winding, the brushes of each pair being relatively adjustable, load brushes associated with said commutator independently adjustable with respect to said shunt excitation brushes and circuits for connecting the armature winding and compound winding in series with said load brushes.

3. A dynamo electric machine comprising a poly-phase shunt field winding, a compounding winding, an armature winding rotatably related with respect to said field windings, a commutator for said armature winding, shunt excitation brushes associated with said commutator for transmitting current from said armature winding to said poly-phase shunt field winding, load brushes independent of said shunt excitation brushes associated with said commutator, circuits for connecting said load brushes in series with said compounding field, said load and shunt brushes being independently adjustable, and means for varying the shunt excitation independently of the adjustment of said shunt excitation brushes.

4. A dynamo electric machine comprising a stator member provided with a poly-phase shunt field winding having the phases independent, and a compounding winding, a rotatable armature winding provided with a commutator associated with said stator member, a pair of shunt excitation brushes on said commutator for each phase of said shunt field winding, said brushes being relatively adjustable with respect to each other and to said stator member, load brushes on said commutator independently adjustable with respect to said shunt field brushes, means for connecting said armature and compounding winding in series with said load brushes, and means for varying the shunt field excitation of said machine independently of the adjustment of said shunt field brushes.

In witness whereof, I have hereunto set my hand this 29th day of May, 1925.

HIDDE K. SCHRAGE.